No. 832,758. PATENTED OCT. 9, 1906.
C. L. TAYLOR.
INGOT STRIPPING APPARATUS.
APPLICATION FILED MAR. 25, 1905.

3 SHEETS—SHEET 2.

WITNESSES
INVENTOR
C. L. Taylor
By H. A. Seymour
Attorney

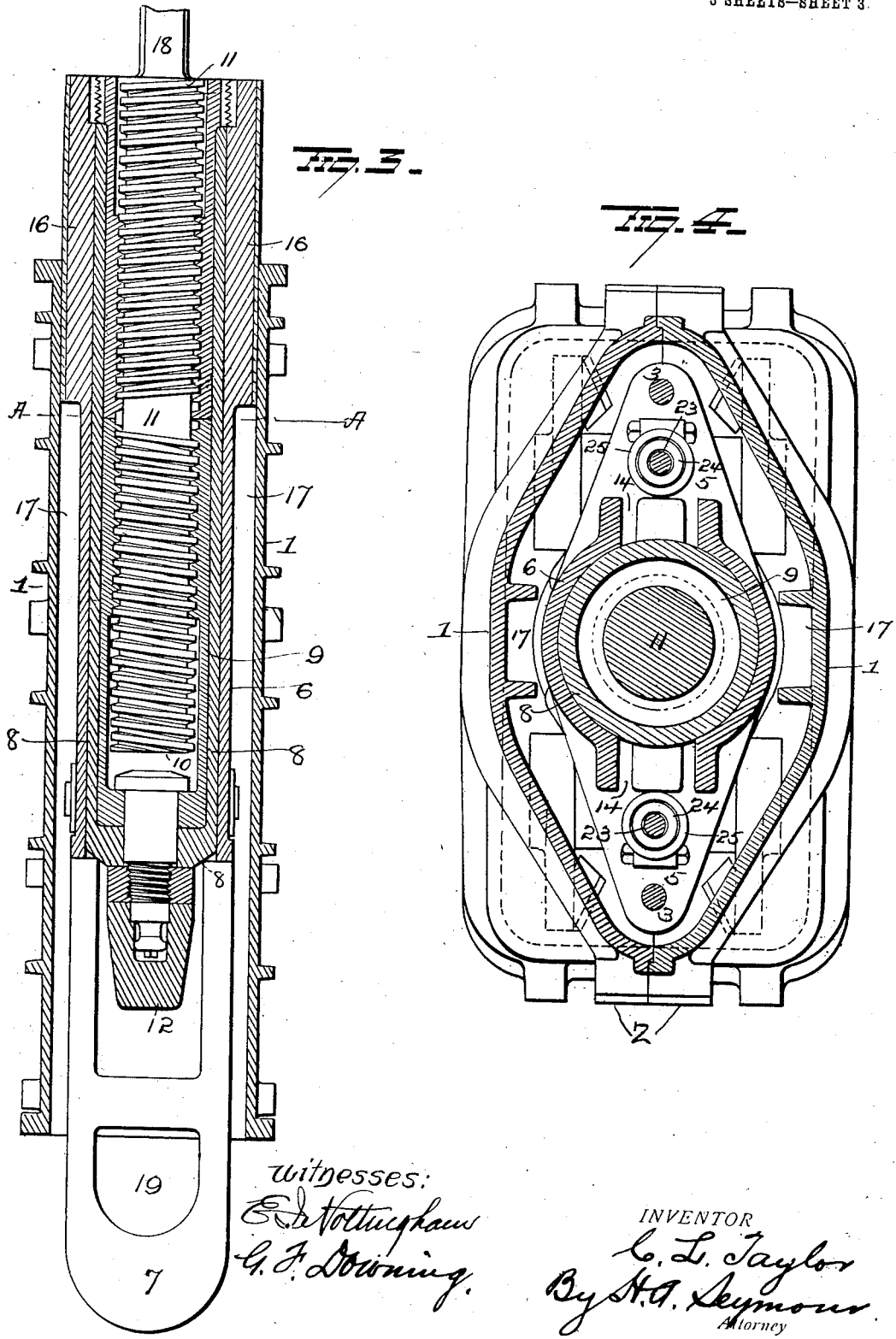

UNITED STATES PATENT OFFICE.

CLARENCE L. TAYLOR, OF ALLIANCE, OHIO, ASSIGNOR TO THE MORGAN ENGINEERING COMPANY, OF ALLIANCE, OHIO.

INGOT-STRIPPING APPARATUS.

No. 832,758.     Specification of Letters Patent.     Patented Oct. 9, 1906.

Application filed March 25, 1905. Serial No. 252,068.

*To all whom it may concern:*

Be it known that I, CLARENCE L. TAYLOR, of Alliance, in the county of Stark and State of Ohio, have invented certain new and useful Improvements in Ingot-Stripping Apparatus; and I do hereby declare the following to be a full, clear, and exact description of the invention, such as will enable others skilled in the art to which it appertains to make and use the same.

My invention relates to an improvement in ingot-stripping apparatus; and it consists in the parts and combinations of parts, as will be more fully described, and pointed out in the claims.

Figure 1:
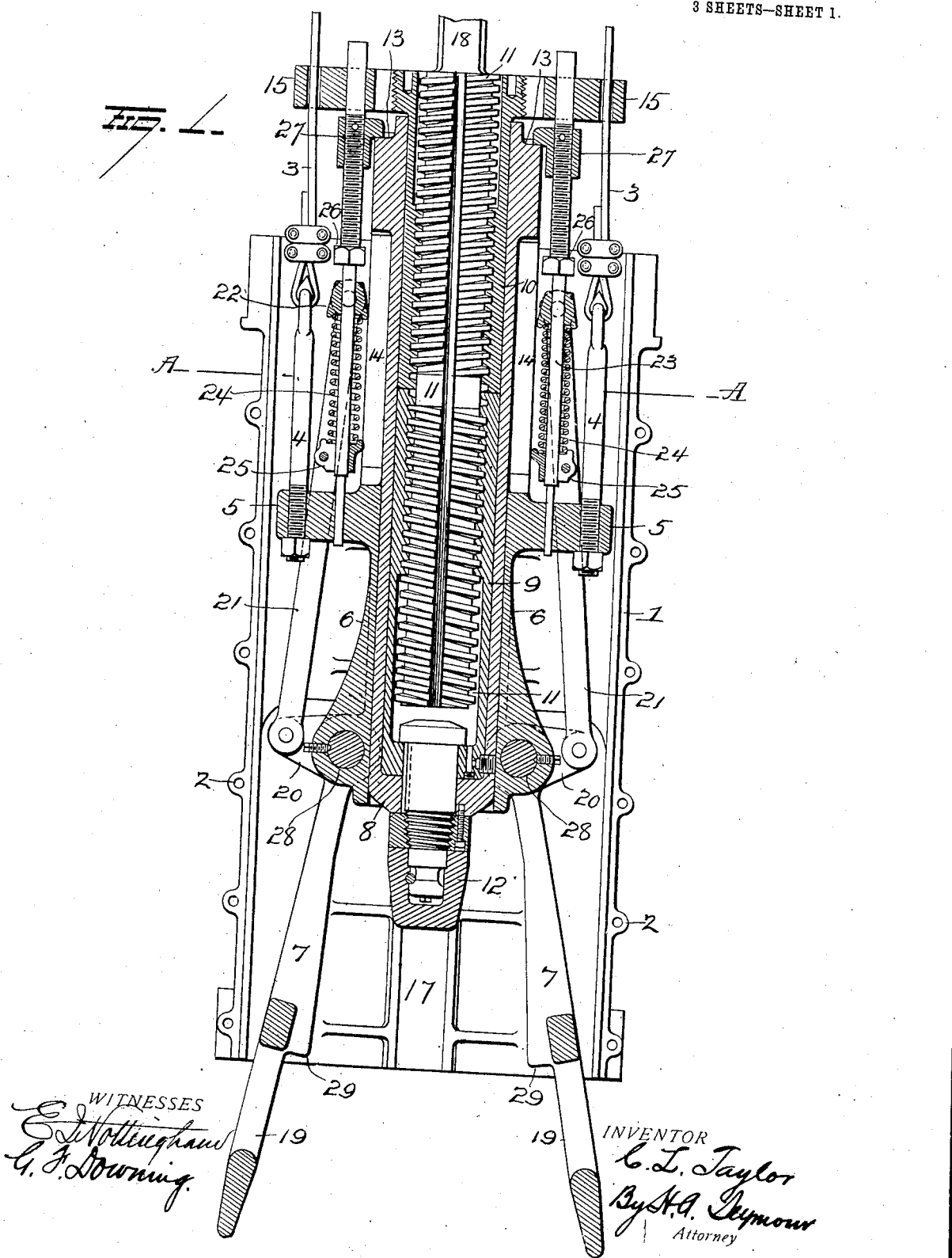
Figure 2:
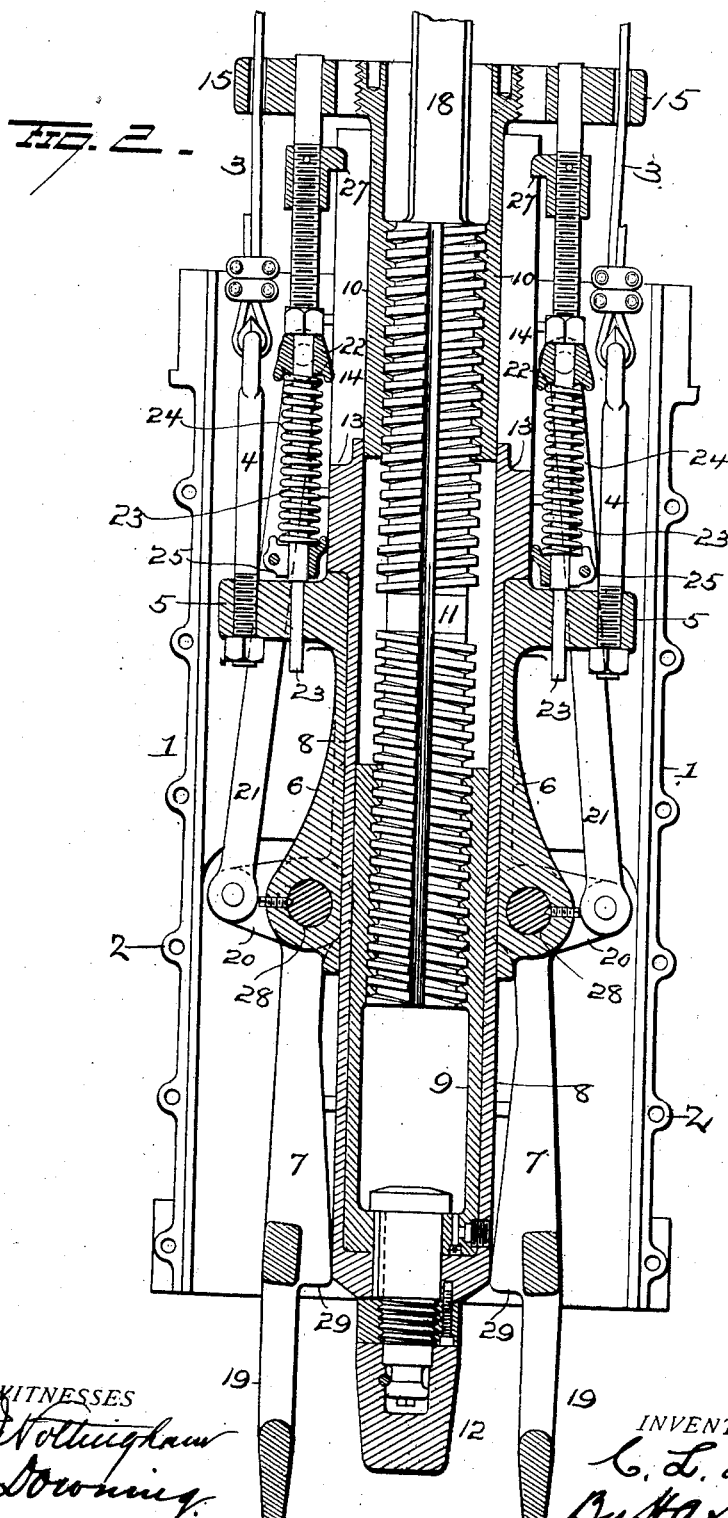

In the accompanying drawings, Figure 1 is a view in longitudinal section of my improvement, showing the thrust-bar or plunger elevated and the tongs open. Fig. 2 is a sectional view showing the thrust bar or plunger depressed and the tongs closed. Fig. 3 is a view in longitudinal section, taken at right angles to Fig. 1; and Fig. 4 is a view in transverse section on the line A A of Fig. 1.

1 represents a casing made of two sections, each provided on its side edges with a series of perforated ears 2 for the passage of bolts or rivets, by which the two sections are secured together. This casing is oblong or oval in cross-section, as shown in Fig. 4, and is secured to and depends from a trolley mounted on a traveling bridge, such as are now in common use with ingot-stripping mechanism and overhead traveling cranes. This casing 1 forms a housing and guideway for the stripping mechanism, which latter is suspended from a drum on the trolley by flexible cables or chains 3. These cables or chains are connected by suitable eyebolts 4 with the cross-head 5 of the carrying-frame 6. This frame 6 carries and supports the stripping mechanism, which comprises two tongs 7, a thrust-bar or plunger 8, two threaded nuts or sleeves 9 and 10, and a right and left hand screw 11.

The thrust-bar or plunger 8 is mounted in and projects through the lower end of the frame 6 and is provided at its lower end with a removable head 12, designed to engage the upper end of the ingot, and at its upper end with diametrically-disposed shoulders 13, which latter rest and move in the correspondingly-disposed slots or guideways 14, formed in the carrying-frame 6 above the cross-head 5. This cross-head 5 engaging the shoulders 13 of the thrust-bar or plunger limits the downward movement of the latter, while its upward movement is limited by the engagement of the upper end of the sleeve or nut 9 with the adjacent end of the sleeve or nut 10.

The sleeve or nut 9 is located within and is secured in any suitable manner to the cylindrical thrust-bar or plunger 8 and is provided internally with a thread which engages the thread on the lower end of the screw 11. The upper sleeve or nut 10 is secured at its upper end to the upper cross-head 15 and is provided internally with a thread engaged by a thread on the screw 11. As before stated, this screw has right and left hand threads, the right-hand threads engaging the threads of one nut or sleeve and the left-hand threads engaging the threads of the other nut or sleeve, so that when the screw is rotated in one direction the tendency is to cause a movement of the nuts away from each other and when rotated in the opposite direction to cause a movement of the nuts or sleeve toward each other. As, however, there can be no longitudinal movement of the nut 10, except when the whole stripping apparatus is elevated and lowered by the cables 3, it follows that when the screw is rotated in the sleeve or nut 10 the screw moves longitudinally in the nut, while the lower nut moves longitudinally on the screw, thus imparting to the nut 9 the longitudinal movement due to the rotation of the screw in said nut and the longitudinal movement of the screw due to its engagement with the threads of a fixed nut. The upper end of the frame 6 is also secured to the cross-head 15 and is provided at points intermediate the guides or slots 14 with projections 16, which rest and move in guideways 17, formed on the inner face of casing 1, thus preventing the frame from turning within the casing.

The supporting cables or chains 3 pass up through the cross-head 15 and are secured to a hoisting-drum on the trolley.

The shaft 18 of screws 11 may pass up through and have a sliding engagement with a pinion on the trolley or it may be encircled at a point below the trolley but above the limit of upward movement of the cross-head 15 by a pinion in engagement with a second pinion on a fixed shaft depending from the trolley. The particular means for transmitting motion to the shaft 18 forms, however, no part of the present invention.

The operation of the parts thus far described is as follows: The trolley carrying the depending frame 1 is moved to a position to bring the stripping mechanism over the mold, and the whole stripper mechanism is then lowered by rotating the winding-drum until the tongs are in a position to engage the ears or lugs on the mold and the head 12 of the plunger in a position over and in close proximity to the ingot. By now rotating the screw the thrust-bar or plunger is forced downwardly until the head engages the ingot. This engagement of the ingot by the head of the thrust-bar tends to move the frame 6 upwardly until the engagement of the tongs with the ears of the mold stops such upward movement, after which the continued rotation of the screw exerts a pulling force on the tongs and a pushing force on the ingot, and these combined forces operate to strip the mold from the ingot. After the mold has been loosened from its ingot the motion of the screw is stopped and the stripping mechanism elevated by the hoist-drum and cables 3 until the mold is clear of the ingot, after which it is carried by the trolley and deposited on a truck conveniently placed to receive the empty molds.

The tongs 7 normally rest in their closed positions, as shown in Fig. 2. These tongs are in the form of bell-crank levers, the longer vertical members having loops 19 to engage the ears or lugs on the molds, while the shorter and horizontal members 20 are pivotally connected at their outer ends to the lower ends of bars 21, the upper ends of which are pivotally connected to the blocks 22. These blocks 22 are loosely mounted on the rods 23, which latter are seated at their ends in holes in the cross-heads 5 and 15. These blocks 22 rest on springs 24, which encircle the rods 23 and rest at their lower ends on the seats 25, secured to the rods. The blocks 22 are limited in their upward movement by nuts 26, adjustably mounted on threaded portions of the rods, and each rod 23 is provided near its upper end below cross-head 15 with a stop 27, resting normally in the path of the shoulders 13 on the sleeve or thrust-bar 8.

With the tongs pivotally mounted on the bearings 28, the weight of the tongs and the bars 21 is sufficient to hold them in their closed position, as shown in Fig. 2. The tendency of the springs 24 is to raise the bars and open the tongs. Hence the springs act as cushions for the tongs in closing and operate to prevent any accidental swinging or swaying movement of the latter.

After the mold has been stripped from the ingot and carried to the truck the screw 11 should be rotated in a direction to elevate the thrust-bar. This upward movement of the thrust-bar carries the shoulders 13 into contact with the stops 27, as shown in Fig. 1, thus elevating the rods 23 and bars 21. This upward movement of the bars, which operates to open or spread the tongs, is cushioned or controlled by the springs 24. Hence if any obstruction should interfere with the free opening movement of the tongs the springs will absorb all the upward movement of the rods, and thus prevent any injury to the tongs or their connections.

Each member of the tongs is provided on its inner face above its eye or loop 19 with an inwardly-projecting shoulder 29.

It sometimes happens when the ingot has not cooled sufficiently that the head 12 will penetrate the ingot and become so tightly embedded therein that the weight of the ingot and mold is not sufficient to dislodge it. When this happens, the shoulders 29 on the tongs overlap the upper end of the mold and stop the upward movement of the mold and hold same while the boot or head is withdrawn by the upward movement of the thrust-bar or plunger.

It is evident that many slight changes might be resorted to in the relative arrangement of parts shown and described without departing from the spirit and scope of my invention. Hence I would have it understood that I do not wish to confine myself to the exact construction of parts shown and described; but, Having fully described my invention, what I claim as new, and desire to secure by Letters Patent, is—

1. In an ingot-stripper the combination with a carrying-frame, ingot-tongs pivoted thereto and a plunger carried by and mounted therein, of means located above the pivots of the tongs and actuated by the upward movement of the plunger for opening the tongs.

2. In an ingot-stripper, the combination with a thrust-bar or plunger and means for moving same vertically, of pivoted tongs having means for engaging lugs on the mold, and provided with inwardly-projecting shoulders overhanging the mold.

3. In an ingot-stripper the combination with a carrying-frame, of a thrust-bar or plunger movably mounted in said frame and tongs pivoted to the frame, the said tongs having inwardly-projecting shoulders adapted to overlap the upper end of the mold.

4. Ingot-stripping tongs having loops or eyes to engage lugs on the mold, and inwardly-projecting shoulders adapted to overhang the upper end of the mold.

5. In an ingot-stripping apparatus, the combination with a carrying-frame, tongs pivoted thereto, and flexible means for suspending said frame, of a longitudinally-movable thrust-bar or plunger carried by and mounted in said frame, tongs pivoted to said frame and means located above the pivots of the tongs and actuated by the upward movement of the plunger for opening the tongs.

6. In an ingot-stripping apparatus, the combination with a carrying-frame, and a plunger or thrust-bar mounted in and guided thereby, the upper end of said thrust-bar having means for engaging the tongs-opening means, of tongs pivoted to the carrying-frame, and means connected to the latter and having parts located within the path of travel of the plunger so as to be engaged by the upper end of the latter.

7. In an ingot-stripping apparatus, the combination with two cross-heads located in the same vertical plane, and two rods loosely mounted in said cross-heads, of a vertically-movable plunger or thrust-bar, pivoted tongs, bars engaging said tongs and connected to blocks slidingly mounted on the rods, and stops on said rods adapted to be engaged by the thrust-bar or plunger during the upward movement of the latter.

8. The combination with a carrying-frame, two cross-heads connected thereto, rods slidingly mounted in said cross-heads, springs on said rods, blocks resting on the springs, and stops carried by the rods, of tongs pivoted to the carrying-frame, bars connecting said tongs and sliding blocks, and a thrust-bar or plunger adapted in its upward movement to engage said stops.

9. The combination with a carrying-frame, two cross-heads carried thereby, and oppositely-disposed guides in said frame intermediate the cross-heads, of a threaded sleeve or nut connected to the upper cross-head, flexible devices connected to the lower cross-head, a plunger or thrust-bar slidingly mounted in the carrying-frame and provided with projections moving in the guides in the carrying-frame, a threaded nut or sleeve secured within said plunger or thrust-bar, and a double screw engaging both nuts for actuating the thrust-bar or plunger.

10. The combination with a carrying-frame and flexible means for suspending same, of a sleeve or nut fixed to said frame, a sleeve or nut movable in said frame, tongs carried by the frame, a plunger mounted in the frame and secured to the movable nut or sleeve, and means located above the pivots of the tongs, and connected with the tongs and engaged by the plunger in its upward movement, for spreading the tongs.

11. Ingot-stripping tongs having means for engaging a mold whereby the latter is lifted, and inwardly-projecting shoulders adapted to overhang the upper end of the mold.

In testimony whereof I have signed this specification in the presence of two subscribing witnesses.

CLARENCE L. TAYLOR.

Witnesses:
E. E. BROSIUS,
A. L. ROBERTS.